US006535813B1

(12) United States Patent
Schmidt et al.

(10) Patent No.: US 6,535,813 B1
(45) Date of Patent: Mar. 18, 2003

(54) METHOD AND SYSTEM FOR SELECTING TRAFFIC INFORMATION SERVICES RECEIVABLE BY AT LEAST ONE MOBILE RECEIVER

(75) Inventors: Heinrich Schmidt, Diekholzen (DE); Katrin Brinkmann, Hildesheim (DE); Ralf Hoffmann, Hildesheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/806,642

(22) PCT Filed: Jul. 6, 2000

(86) PCT No.: PCT/DE00/02227

§ 371 (c)(1), (2), (4) Date: Jul. 2, 2001

(87) PCT Pub. No.: WO01/09858

PCT Pub. Date: Feb. 8, 2001

(30) Foreign Application Priority Data

Jul. 31, 1999 (DE) ........................................ 199 36 114

(51) Int. Cl.[7] ................................................ G01C 21/30

(52) U.S. Cl. ....................... 701/209; 701/117; 701/118; 340/901; 340/905

(58) Field of Search ................................ 701/117, 118, 701/208, 209, 23; 340/901, 902, 905

(56) References Cited

U.S. PATENT DOCUMENTS 5,543,789 A * 8/1996 Behr et al. .................. 340/995

FOREIGN PATENT DOCUMENTS

| | | |
|---|---|---|
| DE | 44 45 582 | 3/1996 |
| DE | 44 42 413 | 5/1996 |
| DE | 197 50 775 | 6/1998 |
| EP | 0 364 749 | 4/1990 |
| JP | 04 329 709 | 11/1992 |
| JP | 06 295 397 | 10/1994 |
| JP | 09 247 019 | 9/1997 |

* cited by examiner

*Primary Examiner*—Gertrude Arthur
(74) *Attorney, Agent, or Firm*—Kenyon & Kenyon

(57) ABSTRACT

In a method and systems for selecting traffic information services that are receivable by at least one mobile receiver and are relevant for a route previously determined by a navigational device linked to at least one receiver, service information, which identifies the services having traffic messages relevant for the route, is read out from a stored list for the determined route. In the case of a plurality of services, a table is created that includes the read-out service information, which is sorted according to a valuation and is able to be modified as the route is followed. A receiver is set, in each case, to the highest-rated service.

12 Claims, 2 Drawing Sheets

METHOD AND SYSTEM FOR SELECTING TRAFFIC INFORMATION SERVICES RECEIVABLE BY AT LEAST ONE MOBILE RECEIVER

FIELD OF THE INVENTION

The present invention relates to a method and a system for selecting traffic information services which can be received by at least one mobile receiver and which are relevant for a route previously determined by a navigational device linked to at least one receiver.

BACKGROUND INFORMATION

Modern navigational devices for motor vehicles are capable today of calculating routes even under consideration of the prevailing traffic conditions. For this purpose, information regarding traffic conditions is to be supplied to the navigational devices; broadcast transmitters having digitally coded traffic messages (TMC messages, TMC=traffic message channel) and other sources and services can be used as message sources. However, for this purpose, it is necessary to tune the receiver that is linked to the navigational device to a service that broadcasts traffic reports relevant for the geographical region traversed by the route.

If such a setting is randomly performed, it can happen that a service is tuned to that does not broadcast any or that only broadcasts infrequent messages that are relevant for the route in question.

From German Published Patent Application No. 44 42 413, a method for tuning a mobile radio receiver and a radio receiver is described, where the particular position determined by a navigational device is used to fetch out a program identification code from a list, so that a transmitter is found that broadcasts information relevant for the ascertained position. It is true that good results can, in fact, be attained when the user of a radio receiver would like to receive traffic messages pertaining to his or her particular position and, for that, requires the correct transmitter. However, using the known method, it is not possible to tune a plurality of broadcast transmitters along the route calculated in the particular case, the tuning of the transmitter and the route search being carried out dynamically.

Broadcasting traffic information services is also possible via broadcast media other than RDS broadcasting, e.g. via digital audio broadcasting (DAB) or via cellular networks according to the GSM standard.

SUMMARY OF THE INVENTION

It is an object of the present invention to use a navigational device to choose from the available broadcast media and/or transmitters when searching for a route, thereby enabling an optimum supply of traffic information over the entire route.

According to the present invention, this object is achieved in that service information is read out for the determined route from a stored list, the information identifying the services having traffic messages relevant for the route; in that, in the case of a plurality of services, a table is created that contains the read-out service information sorted according to a valuation, and that can be changed as the route is followed; and in that a receiver is set in each case to the highest-rated service.

The valuation can be carried out according to features that characterize the services and can be received together with the services themselves or can be retrieved from a memory at the receiver.

Using the method according to the present invention, the DAB tuner can preferably be set, for example, in regions serviced by DAB, in the remaining regions, the RDS tuner can be set, and on selected routes or in response to a particular demand from the user, commercial services broadcast via GSM can be set. In addition, in each case for one region, it is also possible to store and use traffic reports received from a plurality of services.

One further refinement of the present invention makes it possible when searching for a route with the aid of a navigational device, to select the service that can be received by a receiver in such a manner that the reception of relevant traffic messages is optimized over as much of the entire route as possible.

In present-day radio broadcasting, this is achieved, for example, in that at least one receiver is a radio receiver for receiving transmitters having traffic messages; in that program identification codes are fetched out from a stored list for the determined route, the list identifying transmitters having traffic information relevant for the determined route; in that, in the case of a plurality of fetched-out program identification codes, a table is created that includes the fetched-out program identification codes sorted according to a valuation, and that can be changed as the route is followed; and in that the radio receiver is set in each case to the highest-rated, receivable transmitter.

In the case of additional services, e.g. DAB, this method can be applied once minimal adaptation to the technical specifications of the particular service has been made.

Provided that they are supplied with a sufficient number of traffic messages, navigational devices, which can calculate the route even under consideration of the instantaneous traffic conditions, correct the route on the basis of the traffic messages, both at the start of a trip, as well as during the trip in the case of an initially calculated route. Furthermore, during a trip, it may be necessary to recalculate the route when the vehicle deviates (be it intentionally or not intentionally) from the calculated route. Regardless of this, the method according to the present invention enables the best transmitter available for this purpose to be set.

In the method according to the present invention, it is preferably provided that the stored list for the program identification codes includes information regarding the reception area, the region covered by the message content (message area), the known frequencies, and an additional message selection carried out by the transmitter.

Often, a plurality of transmitters are relevant for one and the same geographical region. In order to also optimize in this context, it is provided in an additional further refinement that the table of the transmitters to be set is established and actualized by comparing positions on the route to regional information in the list. Preferably, the entries in the thus-determined table are sorted in such a manner that transmitters having the most suitable message content are at the top.

In detail in this context, it can also be provided that the sorted table is transferred to a control device of the radio receiver and is used there as a basis for a transmitter search, the transmitter at the head of the table being searched first.

Transmitters often have different preferences for selecting the traffic messages broadcast by them. Thus, there are transmitters, for example, that only broadcast local traffic reports, or ones that broadcast traffic messages for a larger area. In another further refinement, these characteristics of the transmitter can be taken advantage of in that, in the sorting operation, the particular class of the roads to be traveled are in relation to the other message selection of the transmitter that identifies the road classes for which the transmitter in question broadcasts traffic messages.

According to an advantageous embodiment, the different transmitters or PI codes can be geographically selected in a particularly advantageous manner without the relatively complicated storing of coordinates, in that corresponding program identification codes are specified in the list regarding geographical regions into which a digital road map is subdivided for the navigational device, and in that the program identification codes are read out on a region-by-region basis and sorted as the route is followed.

In this advantageous embodiment, it is possible to take the road classes into exact consideration in that, in the sorting operation, the particular class of the roads to be traveled is in relation to the other message selection of the transmitter that designates the size of the region for which the transmitter in question broadcasts traffic messages, and in that, in the case of different road classes within one region, those which are most prevalent within one region are used for the sorting.

In an advantageous system for implementing the method according the present invention, it is ensured that the current state of the list and the digital road map reliably agree by the list being stored on the same data carrier as a digital road map, preferably on an optically readable disc (CD ROM).

To continuously adapt the route to potentially quickly changing traffic conditions, frequent access to TMC transmitters may be necessary. So that this is not associated with disturbing interruptions in the reception of the remaining programs, it is provided in another advantageous system for implementing the method according to the present invention that the radio receiver has two receiving sections, which can be set independently of one another.

DETAILED DESCRIPTION

Figure 1:
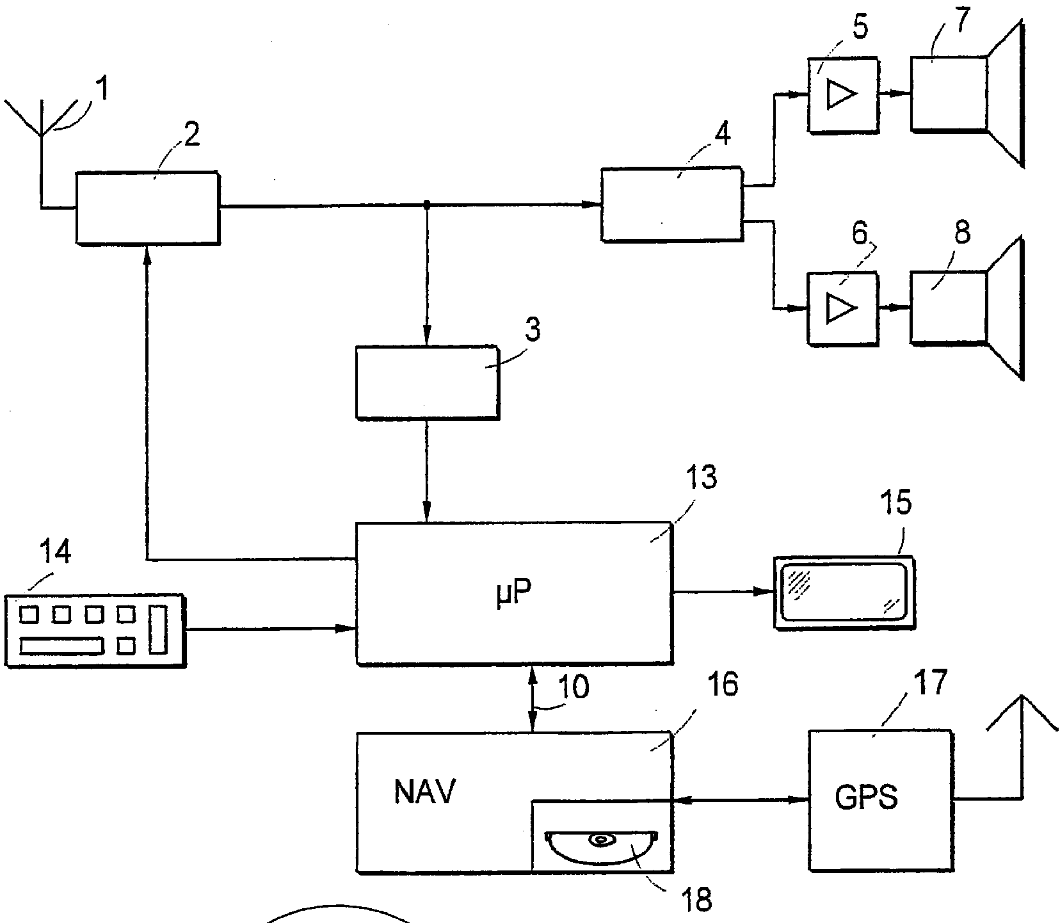
FIG. 1 shows a radio receiver and a navigational device set up for implementing the method according to the present invention.

The radio receiver represented in FIG. 1 has a receiving section 2 having an antenna 1, the output of the receiving section being linked, on the one hand, via NF processor 4 and output stages 5, 6 to speakers 7, 8, and, on the other hand, via an RDS decoder 3 to a microprocessor 13. The microprocessor is used to control the entire radio receiver and is designed, among other things, to select and decode individual pieces of information, e.g. program identification codes (PI codes) and digital traffic messages, from the RDS signal decoded by 3.

Furthermore, microprocessor 13 is connected to a keyboard 14 and a display 15 with which diverse inputs (setting the transmitter, volume, muting received transmitters) can be carried out, and required information (the operating state of the receiver, the set transmitter, traffic messages represented as text) can be transmitted. Microprocessor 13 also has an output that is linked to a control input of receiving section 2, so that receiving section 2 can be set by hand using 14 or to transmitters stored in microprocessor 13.

Figure 2:
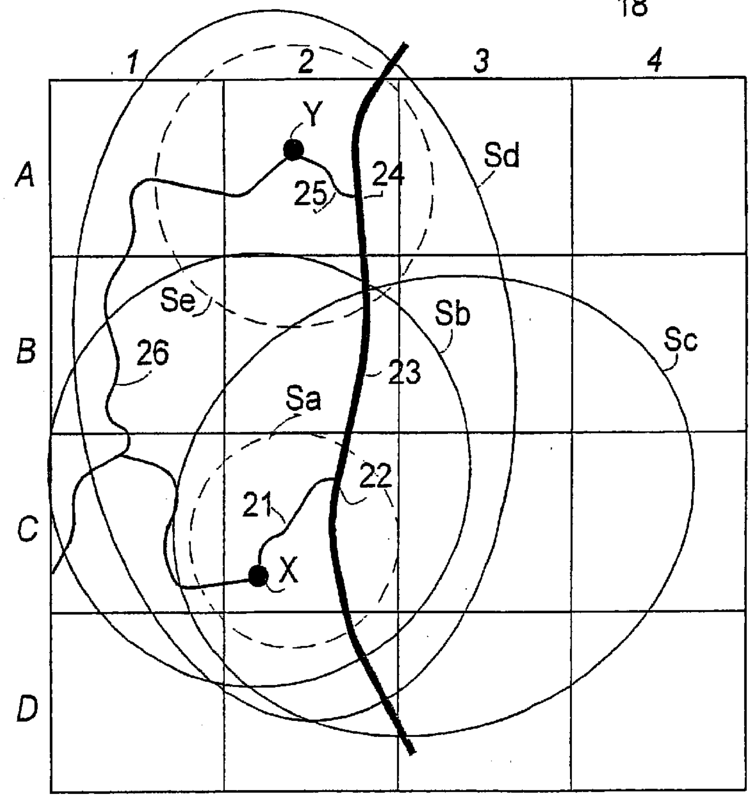
FIG. 2 shows a section of a road map for explaining the method according to the present invention.

Microprocessor 13 of the radio receiver is linked via a bidirectional data connection 10 to a navigational device, which can also be controlled by a microprocessor, which is not shown. The information for the route search or for adapting the route search to the particular course of the trip is extracted from a mass storage unit 18, e.g. a CD-ROM, and from a GPS position finding device 17. In addition to a digital road map, of which a section is shown in FIG. 2, there is a list in mass storage unit 18 of those transmitters broadcasting digitally coded traffic messages (TMC messages). The list is ordered according to PI codes and, for each PI code, includes a reception area, a message area, frequencies at which programs having the respective PI code are broadcast, and other message selection performed by the transmitter, e.g. only local, regional, and national messages.

Figure 3:
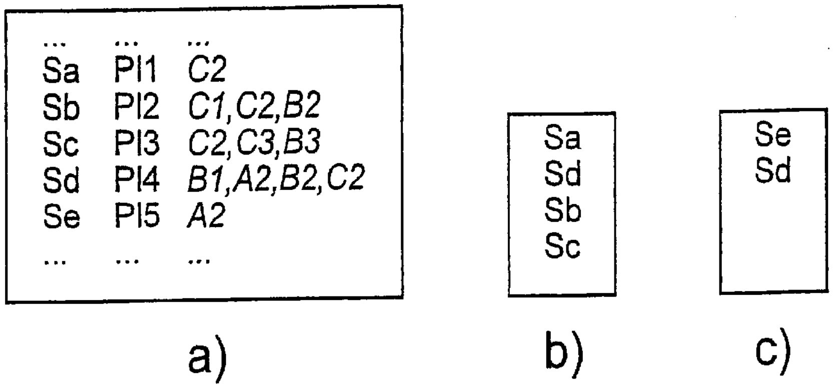
FIG. 3 shows a PI list and tables used in the method according to the present invention.

The partial list represented in FIG. 3*a* shows entries of the five transmitters Sa through Se having the PI codes PI1 through PI5. In FIG. 2, the reception areas of transmitters Sa through Se are represented as to be synonymous with the transmitters. In the exemplary embodiment, the data file is set up in a particularly simple manner in that the regions of the digital map (FIG. 2) are partitioned into areas, also referred to as PI areas in the following, and in that, for each of these areas, the appertaining transmitters are identified in the list. Thus, according to the list in FIG. 3*a,* for example, transmitter Sa broadcasts traffic messages for area C2, and transmitter Sb broadcasts traffic messages for areas C1, C2, and B2. As a result, it is not necessary to assign the message areas of the individual transmitters to the geographical coordinates.

Based on its own position, navigational device 16 determines in which PI area the vehicle is located and can jump directly to the appropriate section of the PI-code table, where the navigational device then finds one or more PI codes, e.g., as in FIG. 3*a,* the PI codes PI1 through PI4 for area C2.

If a plurality of PI codes are present, the trip route is first checked to determine which road classes are being used, whether, for example, highways or city roads are being used. In the following, this process is elucidated further on the basis of FIGS. 2 and 3. FIG. 2 shows a section of a total of 16 PI areas, i.e., A1 through D4, of the digital road map. For a trip from a location X to a location Y, searching for a route produced the results that from X, a local road 21 is first followed to a highway junction 22, then highway 23 is traveled to junction 24, and finally a local road 25 is again used. Another road 26, which also leads from X to Y, is not suggested to the driver, since this is a curvaceous route and would require more time. The reception areas of transmitters Sa through Se are indicated with circles or ellipses. If the major portion of a PI area is in the reception area, it is listed in the table according to FIG. 3*a* at the respective transmitter.

Transmitters Sa and Se are local transmitters, while transmitters Sb, Sc, and Sd can be received supraregionally. At the onset, the receiver is in region C2. According to the list, transmitters Sa through Sd should be able to be received there. Since the first road 21 is not a highway, local transmitter Sa is initially given the highest priority. The remaining transmitters are assessed according to the valuation of their receivability in the subsequent PI areas B2 and A2. Since transmitter Sd can be received in all three PI areas, the transmitters are relayed in the sequence represented in FIG. 3*b,* i.e., Sa, Sd, Sc, to microprocessor 13 of the radio receiver.

Prior to reaching the highway at 22, the ratio of city/local roads 21 to highway 23 is already reduced so dramatically that the prioritization of transmitter Sa is eliminated. As a result, transmitter Sd is then set, although transmitters Sb and Sc may offer a higher field intensity. Transmitter Sd remains set until the transition to PI area A2. There, the navigational device determines that, for the rest of the trip, mainly side roads will again be used and, therefore, prioritizes transmitter Se, which is favorable for this PI area (FIG. 3*c*) and remains set until destination Y.

Figure 4:
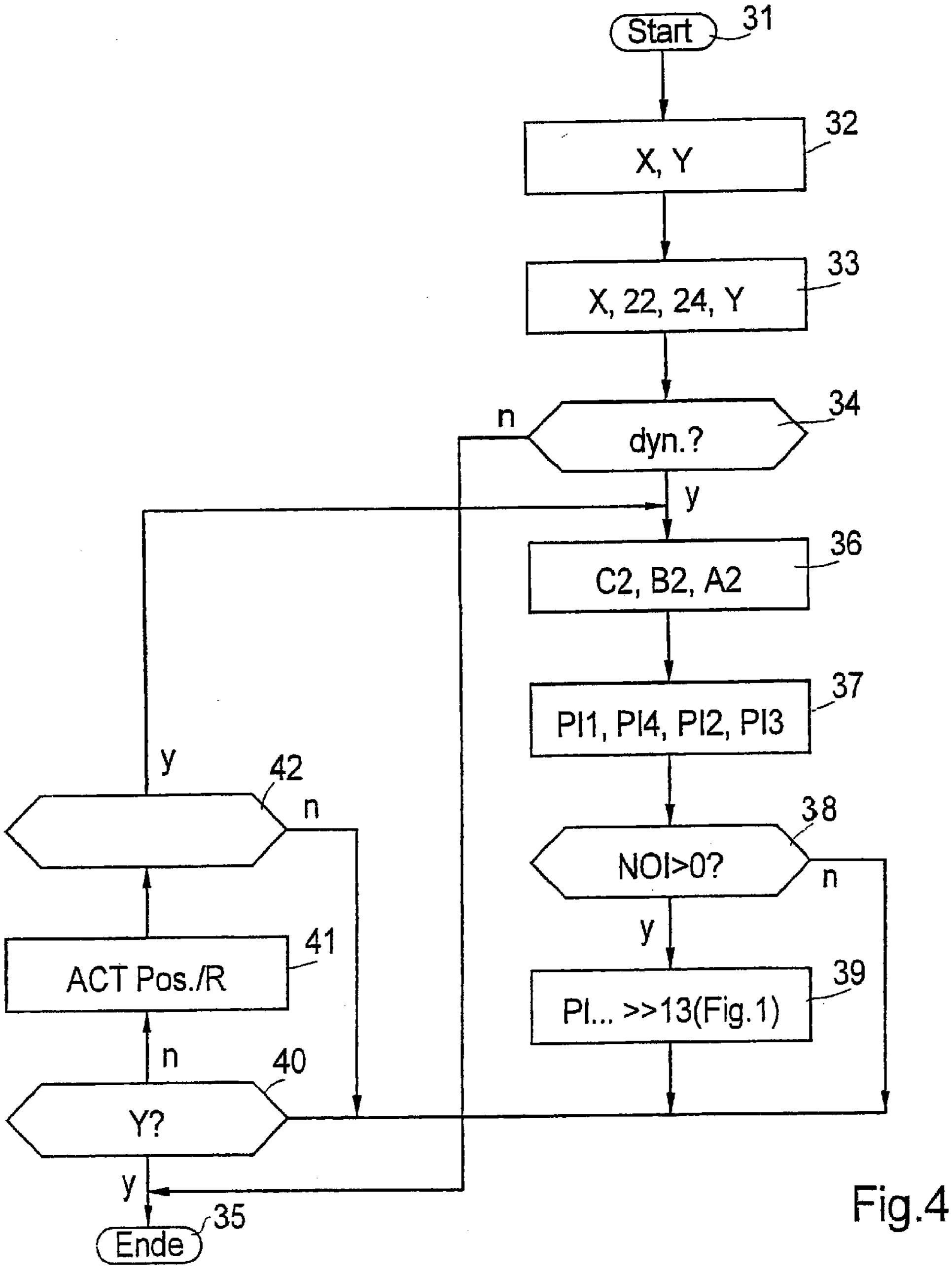
FIG. 4 shows a flow chart of a program for a microprocessor located in the navigational device, the program being designed for implementing the method according to the present invention.

FIG. 4 shows a flow chart of a program that is provided in a microprocessor of the navigational device, for implementing the method according to the present invention. After starting at 31 and inputting X and Y at 32, the route is calculated at 33 with the result X, 22, 24, Y. Then, the program waits for an input as to whether a dynamic navigation is desired. If this is not the case, the program is ended at 35. However, if a dynamic navigation is desired, the PI areas, in the present case C2, B2, and A2, are determined at 36.

At 37, corresponding PI codes are then determined on the basis of the table according to FIG. 3*a*. At 38, the program branches as a function of whether the number NPI of determined PI codes is greater than zero. If a suitable PI code is not previously found, no list is transferred to the radio receiver. In this case, the radio receiver itself, i.e., using the method customary to date, searches for suitable transmitters having traffic messages.

However, if PI codes are found, branch 38 is followed by the PI list (FIG. 3*b*) being transferred to the radio receiver. At 40, a check is made to determine whether the destination has been reached, and, where applicable, the program is ended at 35. However, as long as the destination has not been reached, the position is actualized at 41 and, thus, also the route still to be traveled. In this context, received TMC messages are also taken into consideration, so that other routes can be selected if necessary in the event of traffic disturbances. If the receiver enters a new PI area as a result of traveling on the originally calculated route or on a newly calculated route, it is once again determined after branch 42, at 36 through which PI areas the continuing route travels, the corresponding PI codes being subsequently determined at 37. As long as the receiver has not reached any new areas at 42 and the destination has not yet been reached, the position and the route are actualized at 41 without requiring that the PI 41, code be newly determined.

What is claimed is:

1. A method for selecting a plurality of traffic information services that are receivable by at least one mobile receiver and are relevant for a route previously determined by a navigational device linked to the at least one mobile receiver, comprising the steps of:

for the determined route, reading out service information from a stored list, the service information identifying those of the plurality of traffic information services having traffic messages relevant for the determined route;

in the case of the plurality of traffic information services, creating a table containing the read-out service information, the table being sorted according to a valuation and capable of being changed as the determined route is followed; and setting the at least one mobile receiver, in each case, to a highest-rated one of the plurality of traffic information services.

2. A method for selecting a plurality of traffic information services that are receivable by at least one mobile receiver and are relevant for a route previously determined by a navigational device linked to the at least one mobile receiver, comprising the steps of:

for the determined route, reading out service information from a stored list, the service information identifying those of the plurality of traffic information services having traffic messages relevant for the determined route;

in the case of the plurality of traffic information services, creating a table containing the read-out service information, the table being sorted according to a valuation and capable of being changed as the determined route is followed; and setting the at least one mobile receiver, in each case, to a highest-rated one of the plurality of traffic information services fetching out a plurality of program identification codes for the determined route from the stored list, the program identification codes identifying transmitters having traffic information relevant for the determined route;

in the case of the plurality of fetched-out program identification codes, creating a table that includes the plurality of fetched-out program identification codes, the table including the plurality of fetched-out program identification codes being sorted according to the valuation and capable of being changed as the determined route is followed; and setting the at least one mobile radio receiver, in each case, to a highest-rated and receivable one of the transmitters, wherein:

the at least one mobile receiver includes a radio receiver for receiving the transmitters having the traffic messages.

3. The method according to claim 2, wherein:

the stored list for the program identification codes includes information pertaining to a reception area covered by a message content and corresponding to a message area, known frequencies, and another message selection carried out by at least one of the transmitters.

4. The method according to claim 2, further comprising the step of:

determining and updating a table of the transmitters to be set by comparing positions on the determined route to regional information in the stored list.

5. The method according to claim 4, further comprising the step of:

sorting entries of the table of the transmitters to be set such that those of the transmitters having the most suitable message content are given highest priority.

6. The method according to claim 5, further comprising the step of:

transferring the table of the transmitters to be set to a control device of the at least one mobile receiver, wherein:

the table of the transmitters to be set is a basis for a transmitter search, and the transmitter given the highest priority is searched first.

7. The method according to claim 6, wherein:

in the sorting step, a particular class of roads to be traveled is in relation to another message selection of at least one of the transmitters that identifies road classes for which the at least one of the transmitters broadcasts the traffic messages.

8. The method according to claim 2, wherein:

specified in a list for geographical regions into which a digital road map is partitioned for the navigational device are corresponding ones of the plurality of program identification codes, the method further comprising the steps of:

fetching out the plurality of program identification codes on a region-by-region basis; and sorting the plurality of program identification codes as the determined route is followed.

9. The method according to claim 8, wherein:

in the sorting step, a particular class of roads to be traveled is in relation to another message selection of at least one of the transmitters that designates a size of a region for which the at least one of the transmitters broadcasts the traffic messages, and with respect to different road classes within the region, those road classes that are most prevalent within the region are used for the sorting step.

10. A system for selecting a plurality of traffic information services that are receivable by at least one mobile receiver and are relevant for a route previously determined by a navigational device linked to the at least one mobile receiver, comprising:

an arrangement for, with respect to the determined route, reading out service information from a stored list, the service information identifying those of the plurality of traffic information services having traffic messages relevant for the determined route;

an arrangement for, in the case of the plurality of traffic information services, creating a table containing the read-out service information, the table being sorted according to a valuation and capable of being changed as the determined route is followed; and an arrangement for setting the at least one mobile receiver, in each case, to a highest-rated one of the plurality of traffic information services, wherein:

the stored list and a digital road map are stored on a data carrier.

11. The system according to claim 10, wherein:

the data carrier includes an optically scannable disc.

12. A system for selecting a plurality of traffic information services that are receivable by at least one mobile receiver and are relevant for a route previously determined by a navigational device linked to the at least one mobile receiver, comprising:

an arrangement for, with respect to the determined route, reading out service information from a stored list, the service information identifying those of the plurality of traffic information services having traffic messages relevant for the determined route;

an arrangement for, in the case of the plurality of traffic information services, creating a table containing the read-out service information, the table being sorted according to a valuation and capable of being changed as the determined route is followed; and an arrangement for setting the at least one mobile receiver, in each case, to a highest-rated one of the plurality of traffic information services, wherein:

the at least one mobile receiver includes two receiving sections that are capable of being set independently of one another.

* * * * *